Patented Feb. 20, 1945

2,370,044

UNITED STATES PATENT OFFICE 2,370,044

RUBBER ADHESIVE

Kenneth L. Keene and Ernest G. Bargmeyer, Mishawaka, Ind., assignors to Mishawaka Rubber and Woolen Manufacturing Company, Mishawaka, Ind., a corporation of Indiana No Drawing. Application August 22, 1941, Serial No. 407,906

4 Claims. (Cl. 260—815)

The present invention relates to adhesives and more particularly, to rubber or latex cements consisting essentially of suitably compounded latex or other rubber-like material in aqueous dispersion and adapted to set and cure at appropriate temperatures, preferably room temperatures.

In general the invention contemplates and provides a novel quick setting, preferably self-curing rubber cement which is quite tacky at the time of application and prior to taking a permanent set, so that the parts to be joined thereby do not require to be held together but are immediately self-supporting. Our rubber cement is especially adapted for joining rubber and/or fabric goods such as foam rubber cushions, tennis shoe soles and uppers, and rain coat seams, which are produced in large quantities and which require the use of a rapid setting adhesive in order to increase the production turn over.

Some of the disadvantages of rubber adhesives known prior to our invention were their slow rate of setting and their low initial tackiness. Slow setting cements increase the time and hence the cost of production of articles bonded therewith, so that it is highly desirable to provide a rubber adhesive which will set immediately after application to the parts to be bonded. The low initial tackiness of rubber cements known prior to my invention required that the parts being bonded be secured or held together until the cement acquired a tackiness sufficient to maintain the parts in self-supporting bonded relationship. Moreover, this same characteristic has generally necessitated the application of the cement due to each of the opposing surfaces to be bonded.

Now a prime object of our present invention is to provide a rubber cement characterized by its qualities of rapid setting and great initial tackiness.

Another object of our invention is to provide a rubber cement of great strength, whose strength is developed soon after application instead of after a long drying period.

A further object of our invention is to provide a latex cement sensitized so that it will set to a state of great initial tackiness immediately after application as an adhesive.

Another object of our invention is to provide a latex cement sensitized for high initial tackiness, quick set and rapid cure but stabilized over at least a substantial period of time against premature setting or curing while in storage.

A still further object is to provide a manner of making and/or compounding a latex cement to provide the same with the above enumerated characteristics of initial tackiness, rapid setting and curing ability, at least partial or temporary stability, and other properties useful and desirable in a rubber adhesive.

With these and other objects in view the invention comprises the novel compositions and manners of compounding and using the same set forth in the following description of specific embodiments and pointed out in detail in the appended claims, it being understood, of course, that various changes may be made in the number and proportions of ingredients, as well as substitution of obvious equivalents, within the scope of the claims, without departing from the spirit of the invention or sacrificing any of the advantages thereof.

Our rubber cement, according to a broad aspect of the invention, comprises a latex purified by a single or repeated creamings, compounded with customary vulcanizing agents, accelerators and activators, and sensitized in a variety of manners to be described so as to possess high initial tackiness and rapid setting and curing ability at room temperatures. The invention, according to some aspects thereof, also provides for stabilizing the cement over substantial periods of time in storage.

The above mentioned sensitivity may be attained in several manners. According to one form of the invention it is realized through a variety of factors including pre-heating of the latex, vigorous stirring or agitation while admixing the compounding ingredients therewith, and the use of one or more chemical sensitizers, such as ammonium salts. In another variation, where a high degree of sensitivity is not needed, sufficient sensitivity may be attained by pre-heating of the latex and vigorous agitation of the compounded mixture, which preferably contains zinc oxide and a small amount of ammonia.

The foregoing procedure, while affording satisfactory manners of producing a rubber cement according to the present invention, do however include a number of variables presenting several control factors, such as the temperature of mixing, the time of stirring or agitation, and amount and type of chemical sensitizer, as well as the ammonia content of the latex, ammonia generally being present therein as a preservative. Some control of these variable factors is usually desirable in order to produce a cement of an optimum degree of initial tackiness while still maintaining sufficient stability to allow even spreading and avoid premature setting and curing.

So another aspect of the invention reduces these variables to a single controllable factor by including in the admixture a chemical stabilizer in an amount sufficient to insure adequate stability at ordinary temperatures. Thus, in this latter form of the invention, such close control over temperatures and manipulation, as well as over sensitizing agents, is not needed.

A rubber cement according to the aspect of our invention first mentioned above comprises latex into which have been compounded the usual vulcanizing agents and accelerators. The high initial tackiness characteristic of this adhesive may be brought about by the use of latex purified by a single or repeated creaming pre-heated as desired, admixed with the compounding agents, and agitated with a sensitizer. For this purpose ideal sensitizers have been found to include ammonium salts such as ammonium nitrate, ammonium sulfate, ammonium chloride, ammonium persulfate, and the like.

A typical formula for a foam rubber cement according to this aspect of our invention reads as follows:

Example A

| | Parts |
|---|---|
| Latex (twice creamed, 64% containing 100 parts solids) | 156.25 |
| Piperidinium pentamethylene dithiocarbamate (pip-pip) | 0.50 |
| Zinc benzothiazyl sulfide | 2.00 |
| Zinc oxide | 3.00 |
| Sulfur | 3.00 |
| Ammonium nitrate | 0.20 |
| Water | 36.60 |

The zinc benzothiazyl sulfide, the zinc oxide, and the sulfur may be dispersed in water with gum arabic, bentonite, glue, or soap, or with suitable proprietary dispersing agents. The pip-pip and the ammonium nitrate, being soluble, may be added in water solution.

These agents are added to the purified creamed latex, which may first be heated to, for instance about 100° F. The mixture is then thoroughly stirred with preferably a high speed propeller type mixer, although various other agitating means have proven to be suitable. As the stirring progresses, the adhesive qualities of the compound are tested, and stirring is discontinued when the desired sensitivity has been obtained. It is advisable to cool the cement immediately after adding the sensitizers, either by refrigeration or by adding ice, in order to forestall coagulation. The finished cement can be kept almost indefinitely if kept below 50° F.

The cement produced as just described is highly sensitized for initial tackiness and for rapid setting and curing at normal temperatures, and yet possesses ample stability for the usual handling and working purposes, providing that stirring or agitation is discontinued at the proper time which is determined empirically.

The degree of sensitivity of this cement may be varied according to the requirements of the application by varying the extent of pre-heating the latex, the nature and quantity of the sensitizer employed, the time and intensity of stirring, and the degree of dilution of the cement. The degree of stability of the cement is also controlled by the amount of cooling to which it may be subjected subsequent to stirring in the high speed mixer.

For many applications not requiring such great sensitivity, sufficient sensitivity may be obtained without the use of added sensitizers such as ammonium salts. Sufficient sensitivity may be attained by rapid stirring, having zinc oxide in the mix in the presence of ammonia, or even from the hydrolysis of the zinc benzothiazyl sulfide.

A formula for a rubber cement made without the use of special chemical sensitizers reads as follows:

Example B

| | Parts |
|---|---|
| Latex (twice creamed, 64% containing 100 parts solids) | 156.25 |
| Zinc benzothiazyl sulfide | 1.00 |
| Sulfur | 2.00 |
| Zinc oxide | 2.00 |
| Carbon black | 1.00 |
| Water | 6.50 |
| Casein | 0.06 |
| Ammonia | 0.01 |

In preparation of an adhesive according to the formula of Example B a procedure substantially similar to that previously described is followed. The creamed latex is preferably pre-heated to a temperature of, for example, about 100° F. The compounding ingredients, having previously been dispersed in the water with the aid of the casein or other suitable dispersing agent, are then added to the latex along with the trace of ammonia. The mixture is then vigorously stirred preferably by a high speed propeller type mixer, although any other suitable stirring or agitating means may be employed. Stirring is continued until the desired sensitivity, determined by test, is attained, whereupon stirring is discontinued and the cement either used promptly or reduced in temperature, to about 50° F. or less, and maintained at the relatively low temperature until used.

The latter adhesive is more stable than that previously described, since it contains no special sensitizing agent. However the pre-heating of the latex, and the vigorous stirring of the compounded mixture produces a considerable degree of sensitivity which is generally sufficient for many purposes. In this embodiment of the invention the degree of sensitivity and the stability of the cement may be varied considerably according to the requirements of the application, by the amount of pre-heating of the latex, the extent and intensity of the stirring, as well as the degree of dilution of the cement. These factors are individually controllable and their influence to govern the properties of the finished cement is determinable empirically.

While the cements made according to the formulas A and B, and in the manners previously described, are highly sensitive and show adequate stability for most uses, provided the variable factors are properly controlled, it has been indicated previously herein that a further aspect of the invention eliminates the necessity for close control of the variable manipulative factors in the preparation of the cement, and provides for governing the characteristics and properties of the finished cement by control of a single chemical factor.

This latter aspect of the invention is achieved through the presence in the compounded latex, in addition to a chemical sensitizing agent, of a volatile stabilizer or inhibitor, which retards or inhibits premature activity of the chemical sensitizing agent, while allowing free reaction thereof at the proper and desired time. A sufficient amount of a sensitizing agent, preferably an ammonium salt, is employed in the mix to cause the latex to become quite unstable very quickly when the stabilizer evaporates, the sensitizing agent remaining substantially inactive so long as the stabilizer is present. In order to minimize any effect of the ammonia present in the latex, the ammonia content of the same is preferably reduced to a relatively low figure, approximately .05%, by the use of formaldehyde.

A typical example of a tacky, self-curing cement according to this aspect of the invention is provided by the following formula.

Example C

| | Parts |
|---|---|
| Twice creamed latex, 64% solids, ammonia 0.20% | 156.25 |
| Dimethylamine, 25% solution | 2.50 |
| Formaldehyde, 37% | 1.65 |
| Water | 1.50 |
| Piperidinium pentamethylene dithiocarbamate (pip-pip) | 2.00 |
| Water | 15.00 |
| Zinc benzothiazyl sulfide | 2.00 |
| Sulfur | 3.00 |
| Zinc oxide | 3.00 |
| Water | 6.00 |
| Dispersing agent | 0.40 |
| Ammonium nitrate 25% solution | 5.40 |

In the above example, the dimethylamine solution stabilizes the latex and the formaldehyde reduces the ammonia content to 0.05%. Water is added with the formaldehyde to reduce the tendency toward local coagulation. The pip-pip is dissolved in hot water and immediately added to the latex. Zinc benzothiazyl sulfide, sulfur, and zinc oxide are made into a paste with a dispersing agent such as soap, casein, or other dispersing agent, and added to the latex, either as separate pastes or together. All materials are preferably stirred into the latex with high speed stirring. After the ammonium nitrate has been added stirring is stopped. If it is desired to store the cement for any length of time it should be refrigerated to avoid precure, as previously described.

It should be pointed out that the relative amounts of stabilizer will vary depending on the type of latex used and the use to which it will be put. The vulcanizing ingredients may also be adjusted to any desired amount as is common in latex practice, so that any given type of cure may be achieved. As previously indicated, salts of ammonia, other than ammonium nitrate, may be utilized as the sensitizing agent, and for the stabilizer dimethylamine there may be substituted such agents as sodium or potassium hydroxide, or other relatively strong bases.

The cement made in accordance with this embodiment of the invention possesses great tackiness upon application to a surface, is self-curing, and sets and cures quite rapidly at normal room temperatures. While, as in the previously described characterizations of the invention, the creamed latex of Example C may be preheated prior to addition of the compounding ingredients, and vigorous stirring is preferably employed, it is not necessary to exercise such close control over these manipulative factors, since the stabilizing agent controls the action of the sensitizer. Thus practically the only control feature of this aspect of the invention resides in suitably adjusting the ratio of stabilizer to sensitizer, and these adjustments can be determined empirically and regulated in accordance with particular requirements of the finished cement.

If there is desired a slower curing cement, although one initially sensitized and stabilized in the manner just described, the following formula may be utilized.

Example D

| | Parts |
|---|---|
| Twice creamed latex 64% solids | 156.25 |
| Dimethylamine 25% | 3.00 |
| Zinc benzothiazyl sulfide | 0.50 |
| Sulfur | 2.00 |
| Zinc oxide | 2.00 |
| Dispersing agent | 0.20 |
| Water | 9.00 |
| Ammonium nitrate 25% solution | 2.40 |

In the above example the ammonia is not removed because the cement will be sufficiently stable for ordinary storage conditions if used within reasonable time limits. This cement is suitable for cementing fabric to rubber since it sets both by evaporation and absorption of moisture by the fabric. Thus rapid setting is obtained with a less highly sensitized cement. The cement exemplified by Example D may be compounded and prepared in substantially the same manner previously described in connection with the formula of Example C.

We have described above several embodiments of our invention for providing a rubber or latex cement having great initial tackiness, being capable of setting and curing rapidly at normal temperatures, and yet sufficiently stable, either through manipulative control or chemical activity, for normal cement usages. The cements herein described, moreover, are so tacky at their time of application that only one of two surfaces to be joined need to be spread with the cement. This feature results in marked savings of time and materials over most prior practices wherein it has been necessary to cement coat both opposing surfaces and allow a drying period sufficient to allow the two coatings to become tacky enough for proper adhesion.

It will be appreciated, of course, that variations other than those herein specifically described, within the scope of the appended claims, will be ascertainable from the teachings of our invention, by those skilled in the art. While several variables appear in the different embodiments of our invention, the common generic features of the above described specific embodiments, and all ascertainable variations thereof, are the use of latex purified by one or more creamings, customary vulcanizing agents, accelerators and activators, and the combining or processing of these materials to produce a cement having the desired tackiness, rapid setting and curing ability, and sufficient stability for the desired application, these characteristics being obtained in accordance with the invention either through manipulative control in the mixing or processing, such as preheating of the latex and extent and intensity of stirring or agitation either with or without added sensitizing agents, or by the use of chemical stabilizing agents in combination with added sensitizers. Those skilled in the art will be able to ascertain numerous variations within the spirit of the invention, and the same is to be limited only in accordance with the appended claims.

What is claimed is:

1. A quick setting tacky cement comprising purified latex, a curing agent, a sensitizing agent, and a volatile stabilizer, the sensitizing agent being ammonium nitrate and the stabilizer being dimethylamine.

2. A quick setting tacky cement comprising purified latex, a curing agent, a sensitizing agent, and a volatile stabilizer, the sensitizing agent being an ammonium salt and the stabilizer being dimethylamine.

3. The method of making a heat sensitized tacky rubber cement which comprises, reducing the ammonia content of purified latex to an amount not substantially above about .05%, adding to the latex compounding ingredients including a sensitizing agent and a stabilizing agent, the sensitizing agent being an ammonium salt and the stabilizing agent being a relatively strong base, and subjecting the admixture to vigorous agitation.

4. The method of making a heat sensitized tacky rubber cement which comprises, reducing the ammonia content of purified latex to an amount not substantially above about .05%, adding to the latex compounding ingredients including a heat sensitizing agent and a stabilizing agent, the heat sensitizing agent being ammonium nitrate and the stabilizing agent being dimethylamine, and subjecting the admixture to vigorous agitation.

KENNETH L. KEENE.
ERNEST G. BARGMEYER.